United States Patent [19]
Herz

[11] Patent Number: 5,914,719
[45] Date of Patent: Jun. 22, 1999

[54] INDEX AND STORAGE SYSTEM FOR DATA PROVIDED IN THE VERTICAL BLANKING INTERVAL

[75] Inventor: William S. Herz, Newark, Calif.

[73] Assignee: S3 Incorporated, Santa Clara, Calif.

[21] Appl. No.: 08/753,923

[22] Filed: Dec. 3, 1996

[51] Int. Cl.$^6$ .................................................. G06T 17/00
[52] U.S. Cl. ............................................ 345/418; 345/419
[58] Field of Search .................................... 345/418, 419, 345/420, 423; 348/617

[56] References Cited

U.S. PATENT DOCUMENTS 5,543,850   8/1996   Pratt et al. ............................... 348/617

*Primary Examiner*—Phu K. Nguyen
*Assistant Examiner*—Cliff N. Vo
*Attorney, Agent, or Firm*—Fenwick & West LLP

[57] ABSTRACT

A graphics display system processes text data in a video signal, preferably in the vertical blanking interval, and allows a user to selectively display the text data in real time, search the text data, or obtain a transcript of the data. A digitizer and decoder circuit extracts the text data from a video signal and adds an identifier to the text data. A graphics user interface accelerator stores the text data. Concurrent with adding the identifier and the storage of the text data, the digitizer and decoder circuit adds an identifier to the video and audio data, and the graphics user interface accelerator stores the video and audio data. The identifier added to the video and audio data links such data to the associated text data. In response to a user search request, a host processor scans the stored text data for text data that matches a user selected input, and retrieves the text data matching the user selected input. In response to a user command, the host processor retrieves the video and audio data having an identifier matching the identifier of the retrieved text data. The graphics user interface accelerator displays the video data and plays the retrieved audio data. In response to another user command, the host processor provides the retrieved text data to an external device for printing.

28 Claims, 5 Drawing Sheets

INDEX AND STORAGE SYSTEM FOR DATA PROVIDED IN THE VERTICAL BLANKING INTERVAL

CROSS-REFERENCE TO RELATED APPLICATION

The subject matter of this application is related to the subject matter of U.S. patent application Ser. No. 08/676,527, entitled "Closed Captioning Processing Architecture" filed on Jul. 9, 1996 by William S. Herz and Sunil S. Mahajan.

FIELD OF THE INVENTION

The present invention relates to processing closed captioning data in a graphics system, and more particularly relates to indexing and storing closed caption data from the vertical blanking interval.

BACKGROUND OF THE INVENTION

Video data frequently includes data, such as closed caption text data, that is transmitted during the vertical blanking interval (VBI). The closed caption text data is typically transmitted during line 21 of either the odd or even field of the video frame in a National Television Standards Committee (NTSC) format. Closed caption decoders strip the text data from the video signal, decode the text data, and reformat the data for display, concurrent with the video data, on a television screen. Such closed caption decoders process the text data separately from a video signal. The closed caption data is displayed substantially in real time.

It is desired to have a multimedia system that digitally processes and displays both graphics and video data and VBI data. It is desired to have the GUI accelerator process and store the closed caption data in a manner similar to the processing and storing of video data. It also is desired to have a method of indexing, sorting, and linking the processed video data to the closed caption data.

SUMMARY OF THE INVENTION

In the present invention, a method processes text data in a video signal. The method includes the steps of: extracting the text data from a video signal; adding an identifier to the text data; and storing the text data. Concurrent with adding and storing steps, the method also includes the steps of adding the identifier to the video and audio data; and storing the video and audio data. The identifier added to the video and audio data links the associated text data to the video and audio data.

The stored text data is scanned for text data that matches a user selected input. The text data matching the user selected input is retrieved.

The video and audio data having an identifier matching the identifier of the retrieved text data is retrieved. The video data and playing the retrieved audio data is retrieved. The retrieved text data may be printed.

The identifier is indicative of the elapsed time of the text data, clip, label, or user comment relative to a reference time.

Also in the present invention, a system processes and displays text data in a video signal. A decoder circuit extracts the text data from a video signal and adds an identifier to the text data, and concurrently with such adding, adds the identifier to the video and audio data. A memory structure, such as a hard disk, stores the text data and the video and audio data.

A host processor receives a user selected input and scans the hard disk for the stored text data that matches the user selected input, and retrieves the text data matching the user selected input.

The host processor retrieves from the hard disk the video and audio data having an identifier matching the identifier of the retrieved text data. A display displays the retrieved video data and playing the retrieved audio data. The host processor provides the retrieved text data to an external device for printing. The identifier may be indicative of the elapsed time of the text data, clip, label, or user comment relative to a reference time.

DETAILED DESCRIPTION OF THE PREFERRED EMBODIMENT

Figure 1:
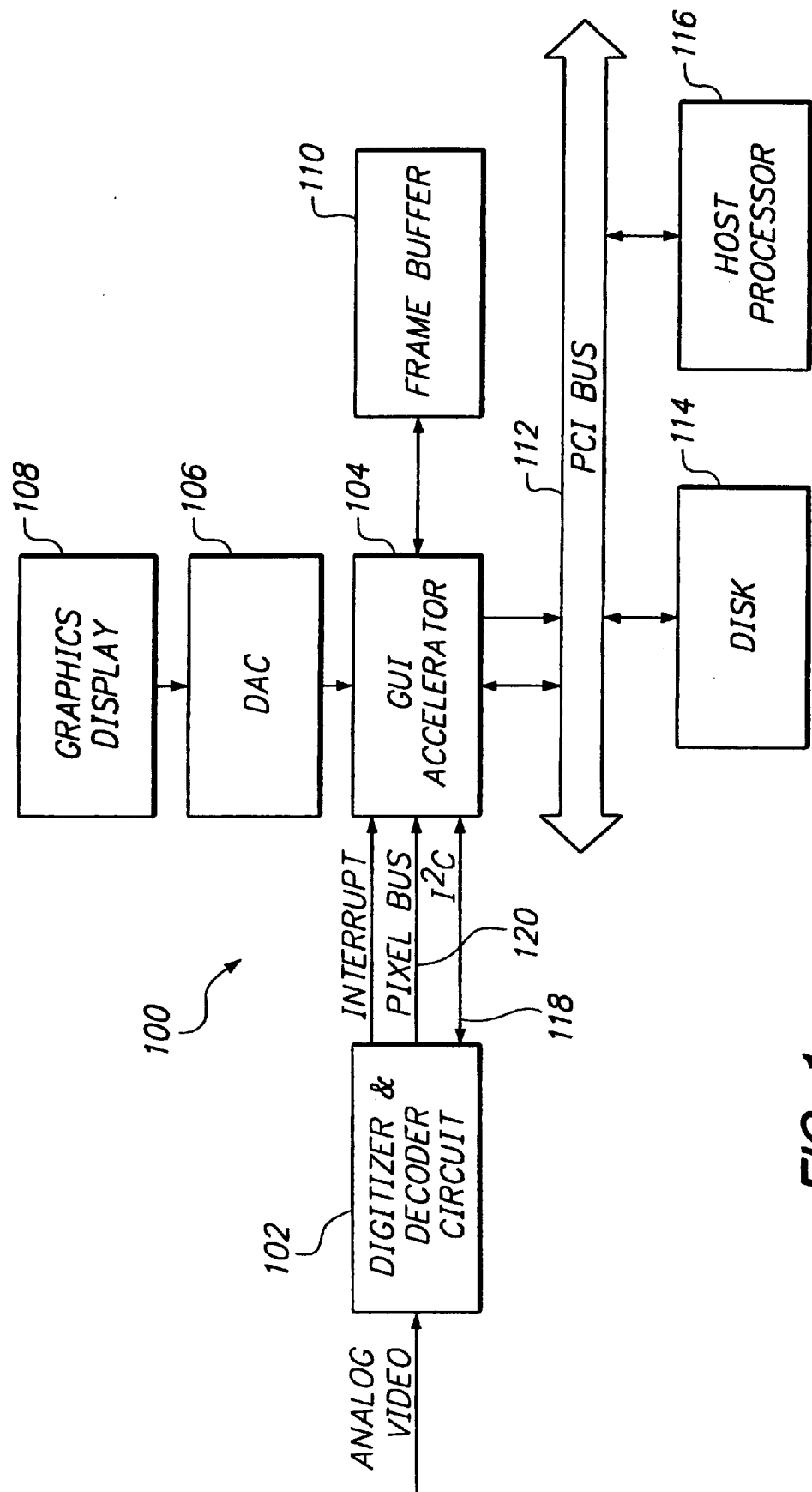
FIG. 1 is a block diagram illustrating a graphics display system.

Referring to FIG. 1, there is shown a block diagram illustrating a graphics display system 100, which includes a digitizer and decoder circuit 102, a graphical user interface (GUI) accelerator 104, a digital-to-analog converter (DAC) 106, a graphics display 108, a frame buffer 110, a bus 112, a hard disk 114, a host processor 116, an I$^2$C bus 118, and a pixel bus 120. Of course, other writable non-volatile memory may be used instead of a hard disk 114. The bus 112 may be, for example, a Peripheral Components Interconnection (PCI) bus. The graphics display system 100 processes video signals and retrieves and processes text data or closed caption data from the video signals. For simplicity and clarity, the graphics display system 100 is described herein as processing closed caption data. The requirements for closed caption data are defined in United States Closed Captioning Standard as defined by the Federal Communications Commission. However, the system 100 may also process text data in the video signals or vertical blanking interval (VBI). The graphics display system 100 may be, for example, part of a computer, such as a personal computer or a global communications network interface computer, e.g. for interfacing with the Internet.

In a first mode of operation, the decoded closed caption data is stored into a register (register 728 of FIG. 7) in the digitizer and decoder circuit 102, and the GUI accelerator 104 reads the stored closed caption data through the I$^2$C bus 118, which provides bi-directional communication between the GUI accelerator 104 and the digitizer and decoder circuit 102. The I$^2$C bus 118 is a bus with a Philips protocol which is well known. The GUI accelerator 104 serves as an I$^2$C bus master. This first mode of operation is well known and understood. In a second mode of operation, the host processor 116 controls the GUI accelerator 104 to capture the closed caption data using the frame buffer 110.

In the second mode of operation, the digitizer and decoder circuit 102 extracts the text data from the video signal. The video signal otherwise is processed and formatted in a conventional manner, which may include scaling or other data manipulation. The digitizer and decoder circuit 102 stores the text data for the current frame and provides the text data for the previous frame to the GUI accelerator 104 via the pixel bus 120. The digitizer and decoder circuit 102 formats the text data so that the GUI accelerator 104 traffics the text data along with the video signal without loss of content from video filtering. The digitizer and decoder circuit 102 also includes an identifier indicating whether the text data is to be captured on the disk or displayed on the display. The identifier is preferably either a capture valid bit or a display valid bit. The digitizer and decoder circuit 102 may be, for example, the digitizer and decoder circuit described in U.S. patent application Ser. No. 08/676,527, entitled "Closed Captioning Processing Architecture" filed on Jul. 9, 1996 by William S. Herz and Sunil S. Mahajan, the subject matter of which is incorporated herein by reference, and is described below in conjunction with FIG. 7.

In response to commands from the host processor 116, the GUI accelerator 104 receives video and text data from the digitizer and decoder circuit 102 via a pixel bus 120, stores the data in the frame buffer 110, and generates graphics data from the data from the digitizer and decoder circuit 102 or from the frame buffer 110. The host processor 116 may be, for example, a Pentium (TM) type processor manufactured by Intel Corporation of Santa Clara, Calif. The GUI accelerator 104 may be, for example, a conventional GUI accelerator having a video pixel bus input, such as a model 86C968 GUI accelerator manufactured by S3, Inc. of Santa Clara, Calif. The frame buffer 110 may be, for example, a conventional video random access memory (VRAM). The size of the frame buffer 110 depends on the resolution and the format of both the video data and the graphics data.

The GUI accelerator 104 generates a vertical synchronization (Vsync) interrupt in response to the vertical synchronization (Vsync) signal in the video signal received from the digitizer and decoder circuit 102. The host processor 116 services the Vsync interrupt by executing an interrupt servicing routine, described below. The host processor 116 uses the Vsync interrupt to determine the timing of the line containing the closed-caption data and then reads such line from the frame buffer 110. The description herein describes the line containing the closed-caption data as line 21. However, the present invention is not limited to line 21. In addition, the data may be text data or other digital data encoded on other video lines.

The latency of the service routine for the Vsync interrupt is unpredictable. In particular, the time difference between the Vsync interrupt, the occurrence of the closed caption data on line 21, and the completion of the service routine is not necessarily predeterminable by the host processor 116, which reads the closed caption data from the frame buffer 110. To ensure that the host processor 116 reads the proper data, the digitizer and decoder circuit 102 buffers the data for one field and resends the closed caption data in the next field. In addition, the data from the digitizer and decoder circuit 102 includes a valid bit indicative of whether the data of line 21 stored in the frame buffer 110 is valid closed-caption data that was not previously read as an interrupt was successfully serviced. The host processor 116 also resets the valid bit via the I²C bus 118 after the text data is processed.

The digital-to-analog converter 106 transforms the digital data from the GUI accelerator 104 into a display format for displaying on the display 108. The digital-to-analog converter 106 may be, for example, a DAC485 manufactured by Brooktree. The display 108 is a conventional display.

Figure 2:
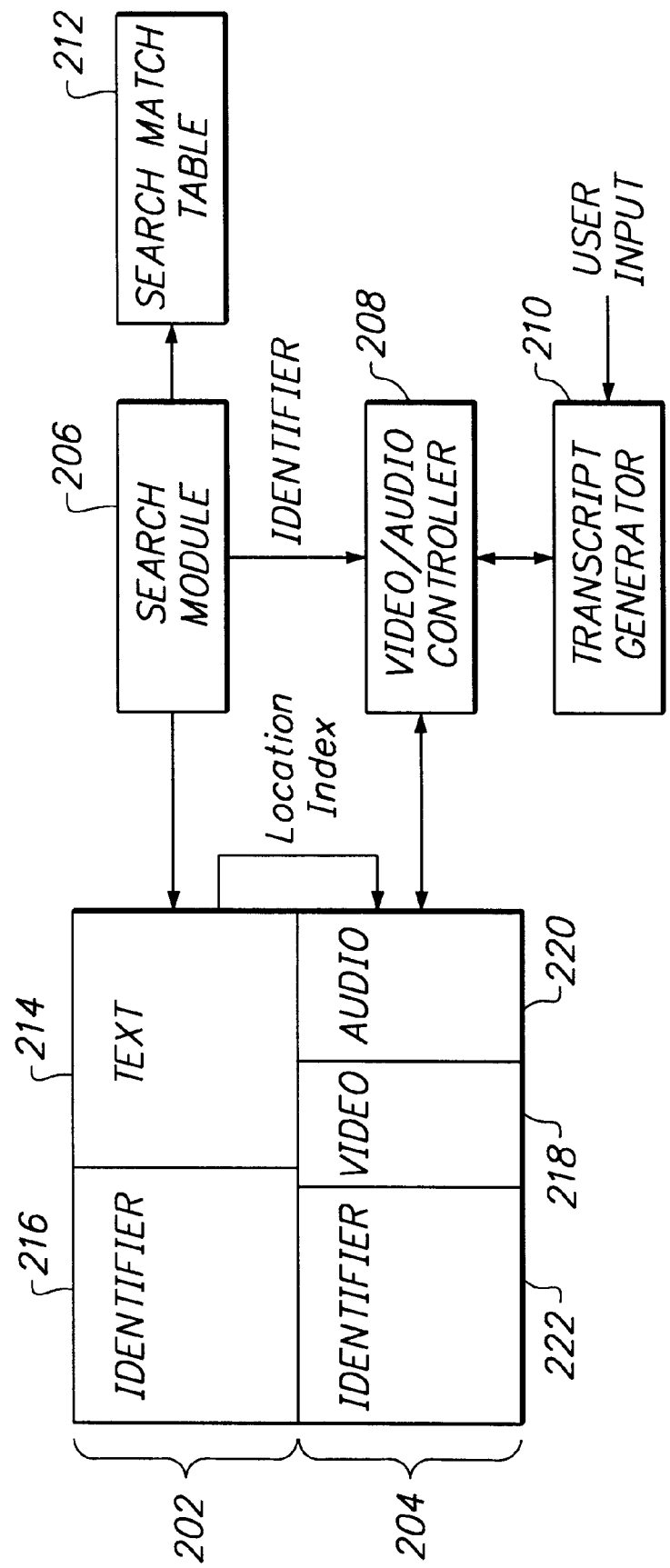
FIG. 2 is a block diagram illustrating storage structure for storing the VBI data.

Referring to FIG. 2, there is shown a block diagram illustrating the storage structure for storing the VBI data. The memory structure includes a text data memory 202, a video and audio data memory 204, a search module 206, a video/audio controller 208, a transcript generator 210, and a search match table 212. The text data memory 202 and the video and audio data memory 204 may be, for example, part of the disk 114. The text data memory 202 stores the text data 214 and an identifier 216 received from the host processor 116. The text data is stored on the disk 114 for capture and placed in the frame buffer 110 for display. The identifier 216 may be, for example, a time stamp, such as an SMPTE time code. The text data 214 may be stored in an ASCII format.

The video and audio data memory 204 stores the video data 218 and the audio data 220 from the video signal, and an identifier 222. The identifier 222 may be equivalent to the identifier of the text data or may provide a link from the video and audio data to the text data that is associated therewith, such as a SMPTE time code or frame counter.

The search module 206 is a program for searching the text data memory 202 for text data 214 that matches user selected data. The video/audio controller 208 is a program that stores and retrieves video and audio data from the video and audio data memory 204. The search match table 212 stores the identifiers 216 of the text data matching the search query. The transcript generator 210 is a program that generates a transcript of the text data that are near the user selected terms.

Figure 3:
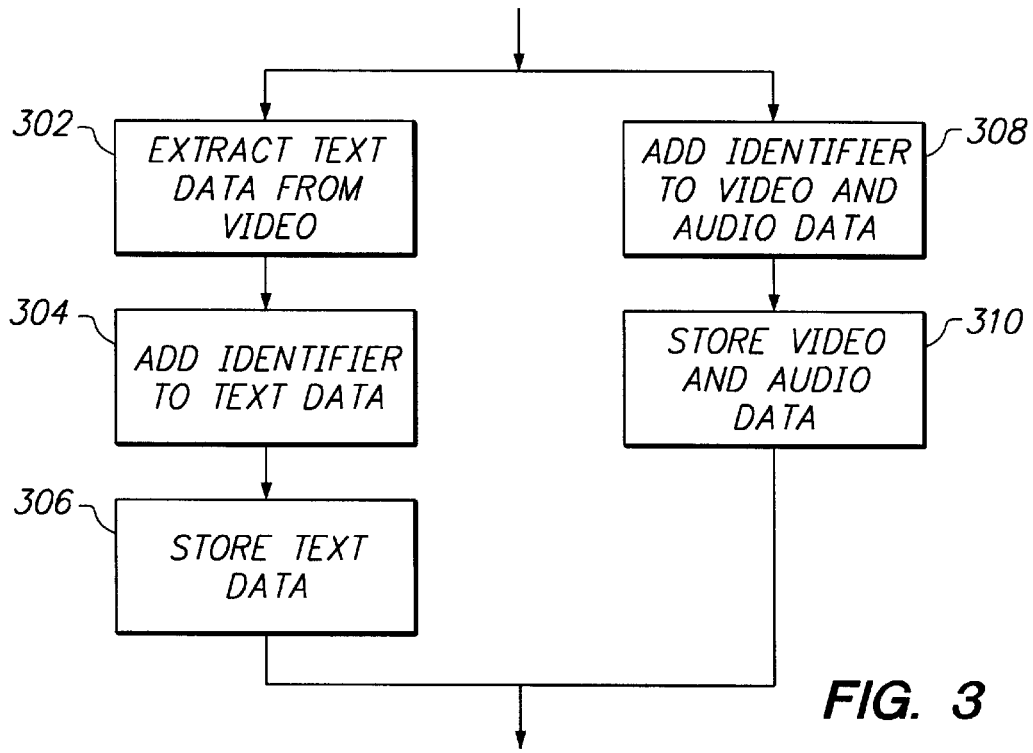
FIG. 3 is a flowchart illustrating the operation of storing the VBI data on a hard disk of the graphics display system of FIG. 1.

Referring to FIG. 3, there is shown a flowchart illustrating the operation of storing the VBI data in the memory of the graphics display system 100. The digitizer and decoder circuit 102 extracts 302 the text data from the received video signal. The GUI accelerator 104 adds 304 an identifier 216 to the text data and stores 306 the text data in the text data memory 202.

Concurrently with the extracting 302, the adding 304, and the storing 306, the digitizer and decoder-circuit 102 adds 308 an identifier 222 to the video and audio data. The identifier 216 links the video and audio data to the associated text data via the identifier 222. The GUI accelerator 104 stores 310 the video and audio data in the video and audio data memory 204. The text data may be stored independently of the video data to allow the text data to be unaltered and usable regardless of any scaling applied to the video data.

The text data may occur over several frames of video data. Accordingly, the digitizer and decoder circuit 102 takes several frames to capture the text data. The digitizer and decoder circuit 102 aligns the text data to the video data using the identifiers 216 and 222.

The text data may be compressed in which the data is encoded before storing. In an MPEG system, the data channel may be encoded and decoded.

Figures 4, 5A:
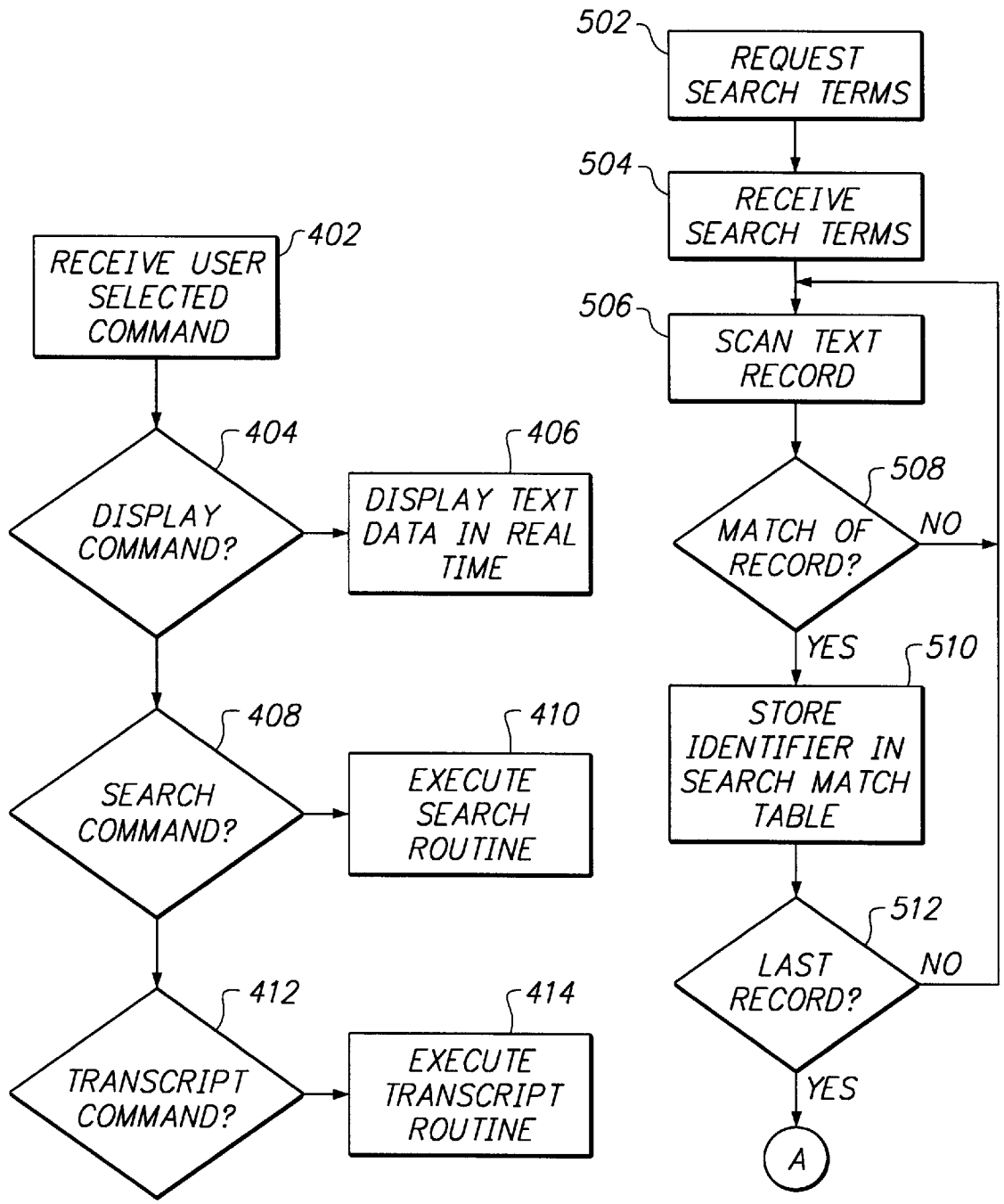
FIG. 4 is a flowchart illustrating the operation of data retrieval of the graphics display system of FIG. 1.

Referring to FIG. 4, there is shown a flowchart illustrating the operation of data retrieval of the graphics display system of FIG. 1. The graphics display system 100 provides the text data in real time, may store the text data for later retrieval, or may provide a transcript of selected portions of the text data.

The host processor 116 receives 402 a user selected command and executes a program in response thereto. Specifically, if 404 the user selected command is a display command, the user is requesting that the graphics display system 100 display 406 the text data in real time. In response to the display command, the host processor 116 commands the GUI accelerator 104 to provide the text data in real time to the DAC 106 for display by the graphics display 108. The GU accelerator 104 includes a conventional digital video decoder (not shown) that abstracts, from the analog representation, the digital data or digital representation of the digital data and converts such data into ASCII characters for display and keying, as needed. Of course the GUI accelerator 104 also may store the text data in the frame buffer 110 concurrent with the real time display.

If 408 the user selected command is a search command, the host processor 116 executes 410 a search routine described below in conjunction with FIGS. 5a–5b.

If 412 the user selected command is a transcript command, the host processor 116 executes 414 a transcript generator routine described below in conjunction with FIG. 6. Of course, the host processor 116 may execute both the search routine and transcript generation.

Figures 5B, 6:
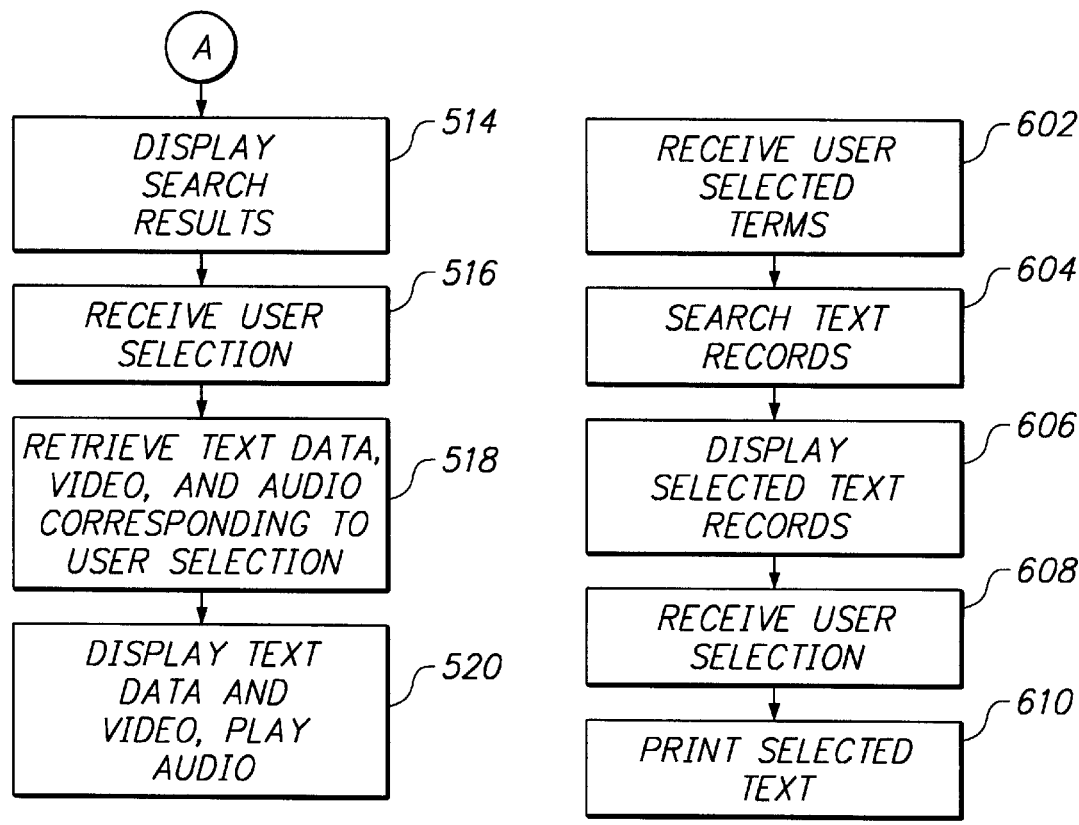
FIGS. 5a and 5b are flowcharts illustrating the search routine of the data retrieval operation of FIG. 4.
FIG. 6 is a flowchart illustrating the transcript generator routine of the data retrieval operation of FIG. 4.

Referring to FIGS. 5a and 5b, there are shown flowcharts illustrating the search routine of the data retrieval operation of FIG. 4. The host processor 116 displays 502 a request for search terms. The host processor 116 receives 504 the user selected search terms. The host processor 116 scans 506 the text records for records matching the search terms. When a match occurs 508, the host processor 116 stores 510 an identifier for the matching text in a search match table 212. The scanning continues until the last record is scanned 512. Alternatively, the host processor 116 may stop scanning upon the first match.

The host processor 116 displays 514 the search results which may include frame number, SMPTE time code, clip name, user comments, or the like. The host processor 116 receives 516 a user selection indicative of the text record selected by the user. Such selection may be made in various ways such as moving a cursor and selecting the indicated record by a cursor or entering a number corresponding to the record.

The host processor 116 retrieves 518 the text data, video, and audio corresponding to the user selection. The retrieved data may be, for example, data that is within a predetermined range or a user selected range of the selected matching text. For example, the text may be text that occurs between 5 seconds before and 20 seconds after the selected matching text. The host processor 116 displays 520 the text data and video, and plays the audio.

Referring FIG. 6, there is shown a flowchart illustrating the transcript generator routine of the data retrieval operation of FIG. 4. The host processor 116 receives 602 user selected terms. The host processor 116 searches 604 the memory for text records matching the user selected terms. The host processor 116 provides the retrieved text records to the display for displaying 606 the selected text records. The host processor 116 receives 608 a user selection indicative of one of the displayed text records. The host processor 116 provides 610 the selected text records to an external device (not shown), such as a printer, for printing the selected text records to provide a transcript of the selected portion of the text data. Alternatively, the transcript may be displayed on the display 106.

A data handling software routine executed by the host processor 116 adds the identifier when the text data is written to the disk 114. To display the text, the GUI accelerator 104 extracts the ASCII text from the closed caption data and maps the ASCII text to letters that are keyed and overlayed on the video.

Figure 7:
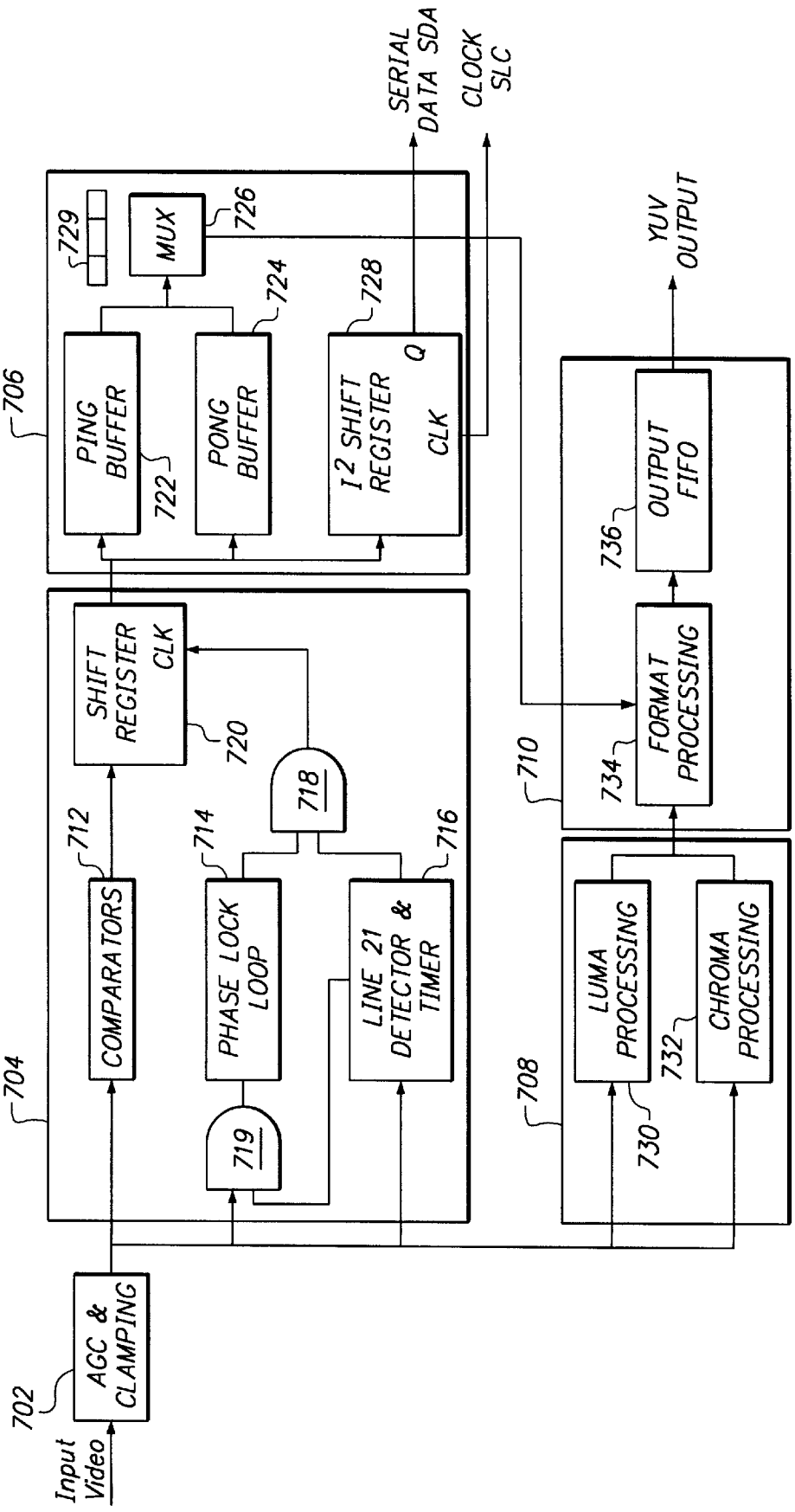
FIG. 7 is a block diagram illustrating the digitizer and decoder circuit of the graphics display system of FIG. 1.

Referring to FIG. 7, there is shown a block diagram illustrating the digitizer and decoder circuit 102, which includes an automatic gain control (AGC) and clamping circuit 702, a closed captioning decoder 704, a closed captioning processor 706, a video signal processor 708, and an output processor 710. The analog video signal is provided to the AGC and clamping circuit 702 which applies conventional automatic gain control and clamping to the received analog video signal to generate a modified video signal. This modified video signal is provided to both the closed captioning decoder 704 and the video signal processor 708.

The closed captioning decoder 704 extracts the closed caption data from the modified video signal. The closed captioning decoder 704 includes a comparator circuit 712, a phase lock loop 714, a line 21 detector and timer 716, a signal-enabling AND gate 718, an input-enabling AND gate 719, and a serial-to-parallel shift register 720. The comparator circuit 712 compares the modified video signal to predetermined values for converting the text data in the modified video signal into a digital text data stream, which is provided to the shift register 720. In the NTSC standard, digital data is amplitude modulated so that a logic "1" has an amplitude between 50 and 100 IRE, and a logic "0" has an amplitude less than 20 IRE. The comparator circuit 712 provides a digital signal having a first logic state (for example, "1") when the amplitude is greater than a predetermined threshold (for example, 50 IRE) and provides a digital signal having a second logic state (for example, "0") when the amplitude is less than the predetermined threshold. The digitizer and decoder circuit 102 has a sampling rate that must satisfy the Nyquist sampling rate of the closed caption data so that the larger data time of the closed caption data allows the circuit 102 to correctly sample the data. For example, the closed caption data is at approximately a 500 kHz rate or 2 $\mu$s and the sampling rate of the circuit 102 is at approximately 13.5 MHz.

The line 21 detector and timer 716 monitors the modified video signal and determines the beginning and end of line 21 of each video field. For illustrative purposes, the detector and timer 716 is described for detecting line 21. Alternatively, the detector and timer 716 may detect another line or multiple lines of a field. At the start of line 21, the line 21 detector and timer 716 provides a line 21 indication signal to enable the input AND gate 719 to provide the modified video signal to the phase lock loop 214. The line 21 detector and timer 716 also enables the signal-enabling AND gate 718. At the end of line 21, the line 21 detector and timer 716 removes the line 21 indication signal to disable the input-enabling AND gate 719. When enabled, the phase lock loop 714 locks the clock in the video signal and provides this locked clock signal to the AND gate 718, which if enabled, provides a clock signal to the shift register 720. In response to the clock signal, the shift register 720 serially shifts in the digital text data and provides the data in parallel to the closed caption processor 706.

The closed caption processor 706 buffers the closed caption data during a first field and transmits the data during the next field. The closed caption processor 706 includes a ping buffer 722, a pong buffer 724, a multiplexer 726, a I$^2$C shift register 728, and a state register 729. The closed caption processor 706 stores the text data in the ping buffer 722 for the first field and transmits the data in the next field. Likewise, the closed caption processor 706 stores the text data in the pong buffer 724 in one field and then transmits the data in the next field. Thus, the closed caption processor alternates between the ping buffer 722 and the pong buffer 724 every odd or even field. The multiplexer 726 is switched every field to alternately provide the text data in the ping and pong buffers 722 and 724. Alternatively, the I²C shift register 728 provides the text data to the GUI accelerator 104. The state register 729 includes a bit that indicates that the digitizer and decoder circuit 102 is to process closed caption text, and includes a bit indicating whether the odd or even field of the video data contains closed caption text. A user may select whether the digitizer and decoder circuit 102 is to process the closed caption text. This selection sets the associated bit in the state register 729. The determination of whether closed caption data is in the odd or even field may be user selected or automated by an auto detection circuit (not shown). This indication is stored in the associated bit of the state register 729.

The video signal processor 708 provides conventional luminance and chrominance components of the video signal. The video signal processor 708 includes a luminance processor 730 for providing a luminance component of the video signal, and also includes a chrominance processor 732 for providing a chrominance component of the video signal. The video signal processor 708 provides video data in a predetermined format, such as RGB or YUV. The format of the video data is now described in a YUV format. The luminance processor 730 provides the Y component of the video data. Likewise, the chrominance processor 732 provides the UV component of the video data. The closed caption data is on the Y bus only.

The output processor 710 formats the video data from the closed caption processor 706 and the video signal processor 708 and provides the formatted video data to the pixel bus 120. In an YUV format, the pixel bus 120 includes a Y bus (not shown) and a UV bus (not shown). The output processor 710 includes a format processor 734 and an output memory 736. The output memory 736 may be, for example, a conventional first-in-first-out (FIFO). The format processor 734 provides video data in the data format of the GUI accelerator 104 to the output FIFO 736, which provides video and text data to the GUI accelerator 104. This format may be, for example, RGB or YUV. The format processor 734 also provides the closed caption text in the same format as the video data to the output FIFO 736. In this format, the GUI accelerator 104 processes the text data without decimation of the data and with scalability of the data. The GUI accelerator 104 may be enabled to scale the data received over the pixel bus 120. During such scaling, the GUI accelerator 104 applies an interpolation to video data received in different bytes of video data. By applying this scaling, the GUI accelerator 104 generates the video signals for display in the appropriate format. Furthermore, the GUI accelerator 104 also applies this scaling to the closed caption data. The format of the closed caption data described below allows the GUI accelerator 104 to apply scaling to the closed caption data and to regenerate the closed caption data in the correct format. Horizontal scaling regenerates the closed caption data in its original format due to the unique method of redundant structuring of the closed caption data prior to storage or display.

The present invention provides concurrent processing and storage of text data and video data by linking the data with identifiers. The text data may be searched and sorted after capture. Selected text may be retrieved along with associated video and audio and displayed. The text may be searched and selected portions printed.

What is claimed is:

1. A method for processing text data in a video signal, the method comprising the steps of:

(a) extracting the text data from a video signal;
   (b) adding an identifier to the text data;
   (c) storing the text data; concurrent with steps (b) and (c),
   (d) adding an identifier to the video and audio data linking the video and audio data to the text data; and
   (e) storing the video and audio data.

2. The method of claim 1 further comprising the steps of:
   scanning the stored text data for text data that matches a user selected input; and
   retrieving the text data matching the user selected input.

3. The method of claim 2 further comprising the step of:
   retrieving the video and audio data having an identifier matching the identifier of the retrieved text data.

4. The method of claim 3 further comprising the step of displaying the retrieved video data and playing the retrieved audio data.

5. The method of claim 4 further comprising the step of displaying the text data concurrently with the retrieved video data.

6. The method of claim 2 further comprising the step of:
   printing the retrieved text data.

7. The method of claim 1 wherein the identifier is indicative of the elapsed time of the text data relative to a reference time.

8. The method of claim 1 wherein the text data is stored independently of the video data to provide unaltered text data independent of scaling of the text data.

9. The method of claim 1 further comprising the step of displaying the text data in real time.

10. A system for processing and displaying text data in a video signal, the system comprising:
    a decoder circuit for extracting the text data from a video signal and for adding an identifier to the text data and for adding the identifier to the video and audio data in the video signal, concurrently with the adding of the identifier to the text data so that the identifier links the video and audio data to the text data;
    an accelerator, coupled to the decoder, for receiving the text data and the video and audio data from the decoder circuit and for outputting the text data along with the video and audio data;
    a memory, coupled to the accelerator, for storing the text data and the video and audio data; and
    a display, coupled to the accelerator, for displaying the retrieved video data and playing the retrieved audio data.

11. The system of claim 10 further comprising:
    a host processor having an input for receiving a user selected input and coupled to the memory for scanning the stored text data for text data that matches the user selected input, and for retrieving the text data matching the user selected input.

12. The system of claim 11 wherein the host processor retrieves from the memory the video and audio data having an identifier matching the identifier of the retrieved text data.

13. The system of claim 11 wherein the host processor provides the retrieved text data to an external device for printing.

14. The system of claim 10 wherein the identifier is indicative of the elapsed time of the text data relative to a reference time.

15. The system of claim 10 wherein the decoder circuit and the memory are included in a computer.

16. The system of claim 10 further comprising:
    a digital-to-analog converter, coupled to the display, for transforming the text data and the video data into a format for viewing on the display.

17. The system of claim 10 wherein the decoder circuit comprises:
   a close caption decoder for extracting text data from the video signal;
   a close caption processor coupled to the close caption decoder, for buffering the text data; and
   an output processor, coupled to the close caption processor, for generating a formatted video data.

18. The system of claim 17 wherein the formatted video data generated by the output processor is in a YUV format.

19. The system of claim 17 further comprising:
   a video signal processor, coupled to the output processor, for receiving the video signal and providing luminance and chrominance components of the video signal.

20. A decoder circuit comprising:
   a close caption decoder stage for extracting text data from a video signal;
   a close caption processor, coupled to the close caption decoder stage, for buffering the text data; and
   an output processor, coupled to the close caption processor, for generating a formatted video data,
   wherein the decoder circuit adds an identifier to the video signal so that the video is linked with the text data.

21. The decoder circuit of claim 20 wherein the close caption processor transmits the text data in a first field and, alternatively, transmits the text data in a second field.

22. The decoder circuit of claim 20 further comprising:
   a video signal processor, coupled to the output processor, for receiving the video signal and providing luminance and chrominance components of the video signal.

23. The decoder circuit of claim 22 further comprising:
   an automatic gain control (AGC) and clamping circuit, coupled to the close caption decoder stage and the video signal processor, for receiving the video signal.

24. The decoder circuit of claim 20 wherein the formatted video data generated by the output processor is in a YUV format.

25. The decoder circuit of claim 20 wherein the close caption decoder stage comprises:
   a comparator circuit having an input terminal for receiving the video signal and an output terminal;
   a phase lock loop circuit having an input terminal and an output terminal;
   a line detector and timer circuit having an input terminal for receiving the video signal, a first output terminal, and a second output terminal;
   an input-enabling AND gate having an output terminal coupled to the input terminal of the phase lock loop circuit, a first input terminal for receiving the video signal, and a second input terminal coupled to the first output terminal of the line detector and timer circuit;
   a signal-enabling AND gate having a first input terminal coupled to the output terminal of the phase lock loop circuit, a second input terminal coupled to the second output terminal of the line detector and timer circuit, and an output terminal; and
   a shift register having a first input terminal coupled to the output terminal of the comparator circuit, a second input terminal coupled to the output terminal of the signal-enabling AND gate, and an output terminal coupled to the closed captioning processor, the shift register capable of serially shifting the text data and generating the text data in parallel.

26. The decoder circuit of claim 20 wherein the close caption processor comprises:
   a first buffer having an input terminal coupled to the close caption decoder and an output terminal;
   a second buffer having an input terminal coupled to the close caption decoder and an output terminal;
   a multiplexer having an input terminal for receiving text data from the first buffer and the second buffer, the multiplexer having an output terminal for providing the text data to the output processor; and
   a state register for indicating the processing of closed caption text by the decoder circuit and for indicating if the closed caption text is contained in an odd field or even field of the video signal.

27. The decoder circuit of claim 20 wherein the output processor comprises:
   a format processor coupled to the video signal processor and to the close caption processor, the format processor capable of formatting the text data and the video signal into a formatted video data; and
   an output memory, coupled to the format processor, for generating the formatted video data.

28. The decoder circuit of claim 22 wherein the video signal processor comprises:
   a luminance processor for receiving the video signal and for providing a luminance component to the video signal; and
   a chrominance processor for receiving the video signal and for providing a chrominance component to the modified video signal.

* * * * *